United States Patent [19]

Moll

[11] 4,290,614

[45] Sep. 22, 1981

[54] SEALING CONSTRUCTION FOR VACUUM CONNECTION

[75] Inventor: Eberhard Moll, Balzers, Liechtenstein

[73] Assignee: Balzers Aktiengesellschaft für Hochvakuumtechnik und Dünne Schichten, Liechtenstein

[21] Appl. No.: 23,782

[22] Filed: Mar. 26, 1979

[30] Foreign Application Priority Data

Mar. 30, 1978 [CH] Switzerland .................... 3390/78

[51] Int. Cl.³ .............................................. F16J 15/08
[52] U.S. Cl. ................................ 277/205; 277/207 A; 277/236
[58] Field of Search ............ 277/205, 236, 207, 207 A

[56] References Cited

U.S. PATENT DOCUMENTS 351,828 11/1886 Bushnell ............................ 277/205
3,285,631 11/1966 Stolpmann ......................... 277/236

FOREIGN PATENT DOCUMENTS 33309 4/1928 France .................................. 277/236
1252175 12/1960 France .......................... 277/DIG. 2

*Primary Examiner*—Robert I. Smith
*Attorney, Agent, or Firm*—McGlew and Tuttle

[57] ABSTRACT

A sealing construction for the interconnection of two pipes in a vacuum connection, comprises, end flanges of the pipes which have conical sealing surfaces and including a substantially C-shape metallic ring disposed between the flanges which has at least a portion of its surface in rolling and sealing engagement with the conical surfaces of the flanges. The construction may also be used between a valve member which includes a plate having a conical sealing surface which is adapted to be sealed with a valve seal of a similar conical surface. The sealing ring may be used between conical surfaces which are substantially parallel or between those which converge or diverge with the use of an additional backing ring and, preferably, also with a centering ring.

10 Claims, 4 Drawing Figures

SEALING CONSTRUCTION FOR VACUUM CONNECTION

FIELD AND BACKGROUND OF THE INVENTION

This invention relates to sealing constructions in general and, in particular, to a new and useful construction for the sealing of two engageable parts using a C-shape ring which is maintained in sealing engagement with conical faces of the parts.

DESCRIPTION OF THE PRIOR ART

Detachable all-metal seals are used where elastomer seals cannot be used because a gas release or gas permeability is too high, or because they are too susceptible to temperature variations, or are not chemically stable enough.

The best known sealing devices substantially comprise even flanges between which a ductile sealing ring, for example, of gold or copper, is plastically deformed. Frequently, the flanges have profiles in the shape of cutting edges which impress themselves into the sealing ring. This requires very high forces and very massive flanges. Such a sealing device raises numerous problems. For example, during the heating of ultra-high vacuum flanges, the sealing forces must not vary substantially since, otherwise, the connection becomes untight in a hot state or later during the cooling. In addition, while reusing the sealing rings, the sealing forces must be increased after each opening and closing. Therefore, the reuse of such sealing rings is very limited and the magnitude of the sealing forces alone raises a technical problem which, even if it can be solved, leads to the well-known clumsiness in the handling of ultra-high vacuum apparatus.

Sealing devices with elastic metal sealing rings between the flanges with even sealing surfaces solve the problems which may arise from the irregular thermal expansion or distortion of the flanges during the heating under vacuum. The problem of high axial sealing forces and the clumsiness connected thereto of the flange constructions and their handling, however, remains unchanged.

SUMMARY OF THE INVENTION

The present invention is directed to a sealing device which permits the construction of ultra-high vacuum systems with relatively thin flanges. The flanges should make it possible to minimize the number of screws or clamps to be used, in order to ensure a simple handling. At the same time, reusable sealing rings are to be employed.

In accordance with the invention, a sealing construction is provided for the interconnection of engageable members, such as two pipes, or a valve and a valve seat, which have engagement members, such as flanges or plates, which are adapted to be interengaged and which comprises a substantially C-shape metallic ring disposed between the conical surfaces of the engageable members and having at least a portion of its surface in rolling, sealing engagement with the conical surfaces.

During the rolling motion at the closure of the sealing device, the elastic sealing ring is clamped and, due to the conical form of the sealing surfaces, high radial sealing forces can be produced by relatively small axial forces. Because of the completely uniform radial load of the flanges, they can be constructed with a minimum of material. Advantageously, this not only reduces expenses, but, in addition, reduces the temperature differences which develop during the heating under vacuum, and the mechanical and vacuum-technological problems connected thereto.

The inventive sealing device makes it possible to use both the inside surfaces and the outside surfaces of conically turned flanges and sealing portions and results in that three different possibilities of mating are given, as will be shown in the following examples of embodiments of the invention.

There are known sealing devices in which only unequal flanges can be mated together. On the contrary, the novel sealing device of the present invention has the substantial advantage of also permitting the mating of flanges which are equal to each other. The tightness of a sealing device is ensured only if the sealing ring contacts both seal surfaces along a closed line. Slight deviations of the sealing surfaces from an exact rotational symmetry are compensated by the elasticity of the sealing ring. Microscopic unevennesses may be compensated by providing a ductile layer having a thickness of some $\mu$m. This layer may be damaged in the initial phase of the closing operation by a short sliding motion. In the inventive design, however, this is without importance for maintaining the tightness since, in the final phase of the closing operation, the rolling motion brings other portions of the sealing ring into contact with the seal surfaces.

Experience has shown that a sealing ring of spring steel, with a gold coating in the thickness of 2 $\mu$m, permits more than 500 closing and opening operations of the sealing device, without losing the tightness needed for ultrahigh vacuum purposes (leakage rate $<10^{-10}$ Torr $\ell$/s, measured with helium). With particularly carefully ground seal surfaces on flanges of high quality steel, a still higher number of closing and opening operations could be obtained, even without any coating of the spring steel sealing ring.

Accordingly, it is an object of the invention to provide a sealing construction for the interconnection of engageable members, such as two pipes or a valve and a valve seat, which members have flanges or plates which are adapted to be interengaged, and which comprises first and second engageable members with respective first and second conical surfaces and a metallic ring of a substantially C-shape cross-section disposed between the engagement members and having at least a portion of its surface in rolling, sealing engagement with the conical surface.

A further object of the invention is to provide a sealing construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE PREFERRED EMBODIMENTS

Figure 1:
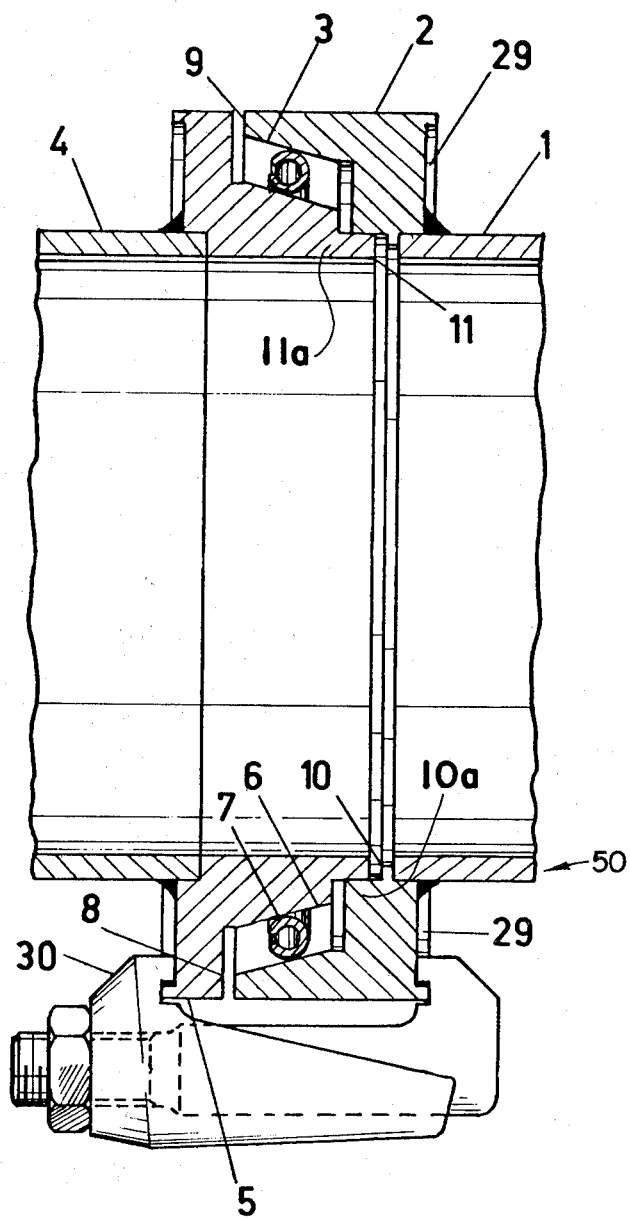
FIG. 1 is a partial, axial, sectional view of a connection between two pipe members, which have flanges at their ends adapted to interengage and constructed in accordance with the invention.

Referring to the drawings in particular, the invention embodied therein, comprises, a sealing device for vacuum connection, generally designated 50, which includes a seal for two engageable members, such as pipes 1 and 4, which have ends with flanges 2 and 5 which are adapted to be interengaged.

FIG. 1 shows a cylindrical part 1 with a flange 2 welded thereto, having a conical seal surface 3 which is to be vacuum-tightly connected to a second cylindrical part 4.

In accordance with the invention, an elastic metal sealing ring 7 has a C-shape cross-section and is inserted between the two seal surfaces 3 and 6. If, during the closing operation, the two flanges 2 and 5 are moved axially toward each other, the radial distance between the two seal surfaces also grows smaller. During this motion, the sealing ring which, in an open position, may be supported by one of the seal surfaces, initially comes into contact with the other seal surface, whereupon, it rolls on the surface and with the increasing pressure on the seal surfaces, a vacuum-tight connection is produced until the two flanges 2 and 5 abut on each other.

As shown in FIG. 1, such an abutment and a centering of the members may be easily obtained by a corresponding shape of the flanges, for example, the axial motion of the flanges may be limited by the corresponding radial outer surfaces 8 and 9, or the radial inner surfaces 10 and 11 with surface 11 carried by an inner centering portion 11a of flange 5 which seats in and centers on outer ring portion 10a of flange 2. Due to the axial abutment of the surfaces, pressure on the sealing ring which is too strong is avoided.

Figure 2:
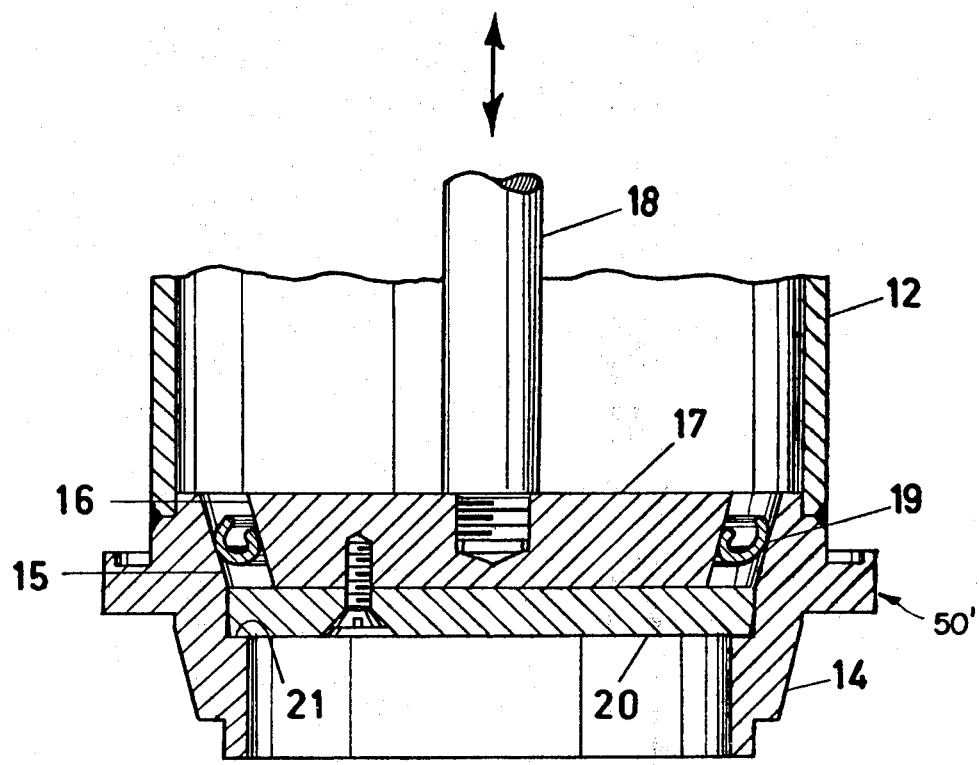
FIG. 2 is a view, similar to FIG. 1, of another embodiment of the invention.

FIG. 2 shows an example of application of the inventive sealing device to a vacuum valve 50'. The drawing of FIG. 2 shows an upper part 12 of a valve housing, as well as a lower part 14, with the conical seal surface 15 forming the valve seat. The opposite seal surface 16 of valve plate 17 is also conical. Valve plate 17 is secured to a valve lifting rod 18. The mechanism for moving the valve rod in the axial direction to open or close the valve is of a conventional design and, accordingly, has not been shown in FIG. 2.

In accordance with the invention, again, a metallic elastic sealing ring 19 is inserted between the two seal surfaces 15 and 16 and can roll on these surfaces. A plate 20 is secured to the underside of valve disc or valve plate 17 to limit the pressure of the sealing ring and, along with shoulder 21 of the valve housing, limits the axial stroke. Such a limiting may, of course, also be obtained by means of stops provided on the valve rod 18. In addition, plate 20 serves to guide the valve disc 17 during the final phase of the closing motion and to secure the sealing ring against dropping out during the opening of the valve. Plate 20 also defines a centering ring which seats in a correspondingly diametered part of lower part 14 like 11a and 10a of FIG. 1.

Figure 3A:
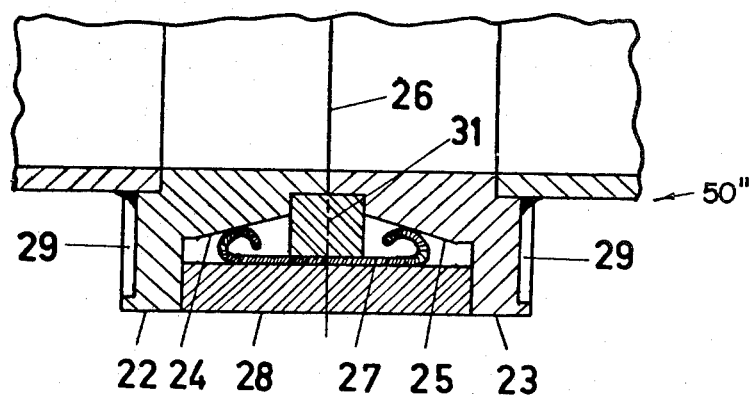
FIG. 3a is a view similar to FIG. 1 of still another embodiment of the invention.
Figure 3B:
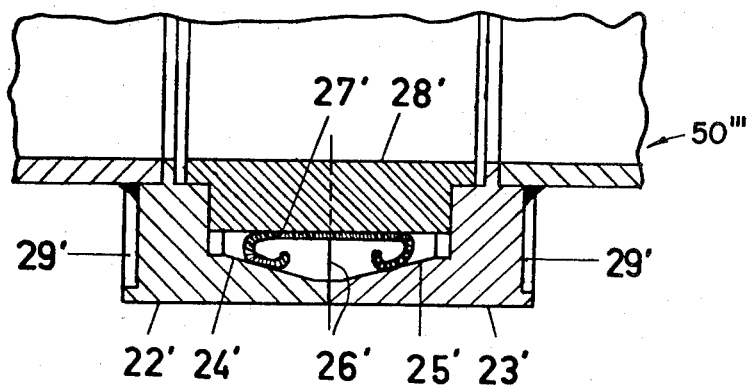
FIG. 3b is a view also similar to FIG. 1 of yet another embodiment of the invention.

In the devices of FIGS. 1 and 2, the parts having the conical seal surfaces which are intended to be connected to each other in a vacuum-tight manner are of unequal shape. However, for flange connections, it is frequently desirable to have two flanges of the same shape. Two examples of how the invention may be applied in such a case are shown in FIGS. 3a and 3b. In these examples, the two flanges 22 and 23, or 22' and 23' are symmetrical of the central plane 26, 26' of the flange connection. Each of FIGS. 3a and 3b shows a half section parallel to the axis of such a flange connection.

The flanges themselves have seal surfaces, 24, 25, or 24', 25, and the two embodiments differ from each other primarily in that, in one case (FIG. 3a), the conical seal surfaces close in the direction of the central plane, and in the other case (FIG. 3b), they open in this direction. The metallic, elastic sealing ring 27 has the cross-section which exhibits a broad back by which the ring bears against a combined supporting and centering ring 28 which, in the case of the valve 50''' of FIG. 3b is designed at the same time as a centering ring. In FIG. 3a, a valve 50'' includes a separate centering ring 31 for the centering, in addition to a backing or supporting ring 28.

It is to be noted that flanges 22 and 23 in FIG. 3a are of the same shape as flange 5 of FIG. 1. Also, flanges 22' and 23' of FIG. 3b are identical with flange 2 of FIG. 1. Therefore, while using the supporting ring 28 or the combined supporting and centering ring 28' and a correspondingly shaped sealing ring 27 or 27' and, in the case of FIG. 3a, an additional centering ring 31, the flange shapes which have been shown can be connected to each other even in instances where, in a specific arrangement, equally shaped flanges, such as those designated in FIG. 1 as 2 and 5, abut on each other. For this reason, the described flange shapes are particularly practical.

Of course, if the inventive sealing device is to be used for flange connections, appropriate mechanisms for pressing the flanges together must also be provided. The simplest mechanism for this purpose are clamps having jaws which engage recesses 29 and 29', shown in FIGS. 3a and 3b and in FIG. 1. In FIG. 1, a clamp of conventional design is indicated at 30 and, for example, three such clamps may be provided and uniformly distributed over the circumference of the flange.

While specific embodiments of the invention have been shown and described in detail to illustrate the application of the principles of the invention, it will be understood that the invention may be embodied otherwise without departing from such principles.

What is claimed is:

1. A sealing construction for a vacuum connection comprising:
   a first engageable member having a first conical sealing surface, an outer centering portion and a first stop surface;
   a second engageable member having a second conical sealing surface juxtaposable adjacent said first conical sealing surface, an inner centering portion for receiving outer centering portion to center said first and second engageable members and a second stop surface abuttable against said first stop surface for fixing an axial relative displacement between said first and second engageable members and providing a space between said first and second conical sealing surfaces; and an annular metallic ring having a C-shaped cross-section disposed between said first and second conical sealing surfaces with legs of said C-shaped cross-section rollable against said first and second conical sealing surfaces to produce a seal between said first and second engageable members.

2. A sealing construction, as claimed in claim 1, wherein said metallic ring is coated with a layer of ductile metal.

3. A sealing construction, as claimed in claim 1, wherein said first and second engageable members comprise pipes having a flange at each end, said flanges having the respective first and second conical surfaces, said ring being disposed between said conical surfaces, and, in an open position, applying loosely thereon, said surfaces being movable for closing and said metallic ring being rollable on the respective surfaces.

4. A sealing construction, as claimed in claim 3, wherein said first and second flanges include a socket-shape flange and a male flange portion engageable in said socket-shape flange, said conical surfaces being in opposition with said metallic ring disposed therebetween.

5. A sealing construction, as claimed in claim 1, wherein said first and second engageable members comprise a valve seat and a valve plate, respectively, said valve seat and said valve plate having said conical surfaces disposed in opposition to each other with said metallic ring being disposed therebetween.

6. A sealing construction, as claimed in claim 5, including a plate guide member secured to said valve plate, said valve seat including a ledge portion engageable by said plate and guide member.

7. A sealing construction, as claimed in claim 3, wherein said flanges include respective first and second oppositely facing engagement recesses and a clamp spanning said flanges and tightened against said engagement recesses.

8. A sealing construction for a vacuum connection comprising:
 a first engageable member having a first conical sealing surface, a first centering portion and a first stop surface;
 a second engageable member having a second conical sealing surface juxtaposed adjacent said first conical sealing surface, a second centering portion and a second stop surface;
 saird first and second engageable members comprising first and second flanges, each having an exterior surface comprising said conical surface;
 an annular metallic ring having a U-shaped cross section disposed between said first and second conical sealing surfaces with legs of C-shaped cross section rollable against said first and second conical sealing surfaces to produce a seal between said first and second engageable members; and
 a supporting ring disposed around said metallic ring and abutting against said ring to hold it in position against said conical surfaces, said supporting ring having a centering part engaged with said first and second centering portions to center said first and second engageable members, and a stop part abutting said first and second stop surfaces for fixing an axial relative displacement between said first and second engageable members and providing a space between said first and second conical sealing surfaces.

9. A sealing construction, as claimed in claim 8, wherein said flanges each include a cut out portion at the ends thereof which face each other and form said first and second centering portions respectively, said centering part of said supporting ring comprising a centering ring disposed between said flanges and received in said cut-out portions.

10. A sealing construction for a vacuum connection comprising
 a first engageble member having a first conical sealing surface, a first centering portion and a first stop surface;
 a second engageable member having a second conical sealing surface juxtaposed adjacent said first conical sealing surface, a second centering portion and a second stop surface;
 said first and second engageable members comprising pipe members having first and second flanges with said conical surfaces defined on an interior annular portion of each of said flanges;
 an annular metallic ring having a U-shaped cross section disposed between said first and second conical sealing surfaces with legs of C-shaped cross section rollable against said first and second conical sealing surfaces to produce a seal between said first and second engageable members; and
 a backing ring disposed interiorly of said metallic ring and between said first and second flanges for urging said metallic ring against said first and second conical sealing surfaces, said backing ring including a centering part engaged with said first and second centering portions to center said first and second engageable members, and a stop part abutting against said first and second stop surfaces for fixing an axial relative distance between said first and second engageable members and providing a space between said first and second conical sealing surfaces.

* * * * *